United States Patent [19]

Epstein et al.

[11] 4,297,534
[45] Oct. 27, 1981

[54] PUSHBUTTON TELEPHONE SET DISABLING MEANS

[76] Inventors: Barry M. Epstein, 7523 Cliffbrook, Dallas, Tex. 75240; Terry M. Gernstein, 6724 Melrose Dr., McLean, Va. 22101

[21] Appl. No.: 109,255

[22] Filed: Jan. 3, 1980

[51] Int. Cl.³ .............................................. H04M 1/66
[52] U.S. Cl. .......................... 179/90 D; 179/189 D; 179/18 DA
[58] Field of Search .......... 179/90 D, 189 D, 18 DA, 179/189 R, 1 D, 84 VF, 6.3 R, 90 K

[56] References Cited

U.S. PATENT DOCUMENTS

| | | | |
|---|---|---|---|
| 4,000,380 | 12/1976 | Jackson | 179/90 D |
| 4,012,602 | 3/1977 | Jackson | 179/90 D |
| 4,092,500 | 5/1978 | Hughes | 179/90 D |
| 4,099,033 | 7/1978 | Murray | 179/90 D |

*Primary Examiner*—Gerald L. Brigance

[57] ABSTRACT

A telephone set which is being used as a pushbutton-type telephone is protected from unauthorized use by a frequency signal altering circuit restricting the output from a built-in TOUCH-TONE (R) signalling pad or other TOUCH-TONE (R) generator. The circuit includes at least one notch filter which, when electrically inserted between the telephone set and a call receiving station, alters at least one of those frequencies generated at the telephone set by pushbutton circuits to dial a number to a form which is not proper for actuating equipment at the call receiving station. The frequency signal altering circuit is located internal to or closely adjacent the telephone set to be protected. Circuits which restrict the output from a telephone are also disclosed.

50 Claims, 25 Drawing Figures

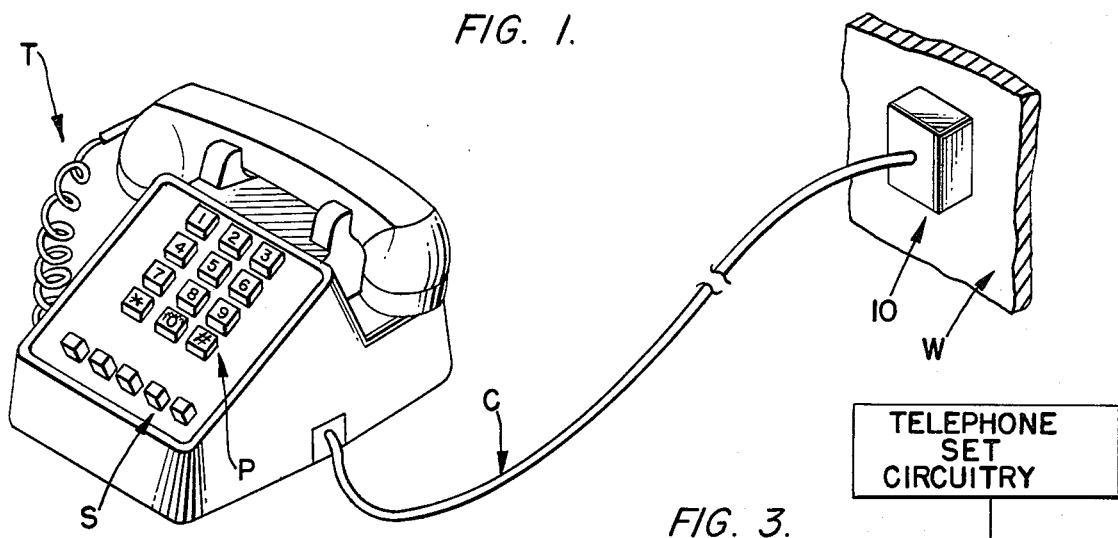

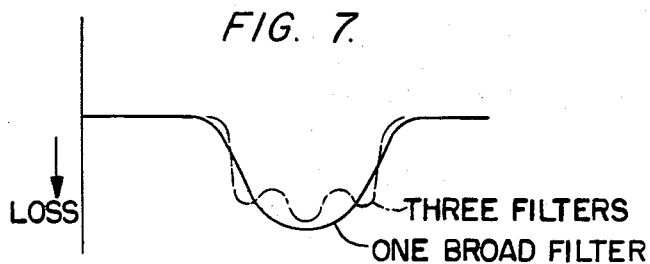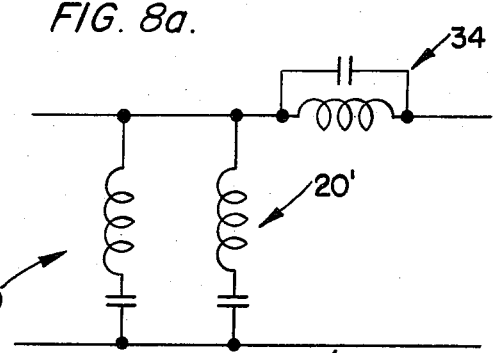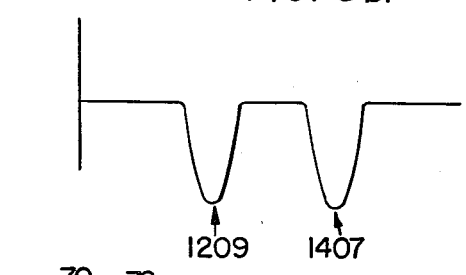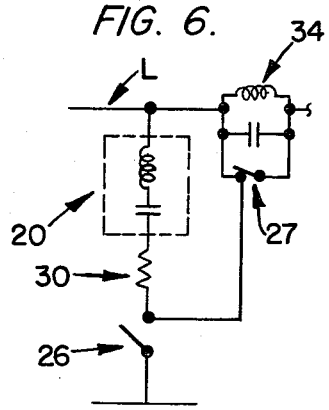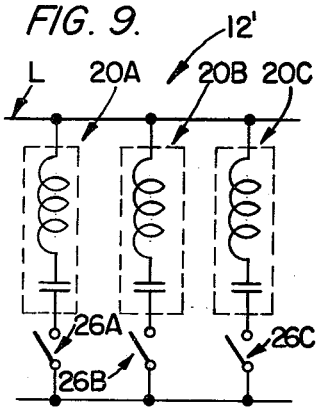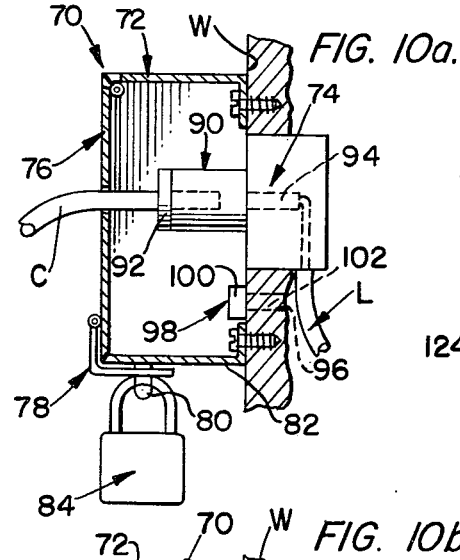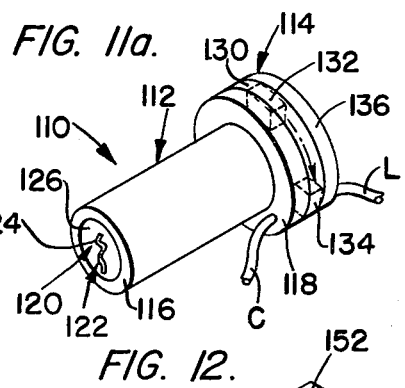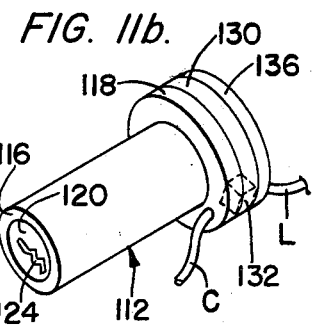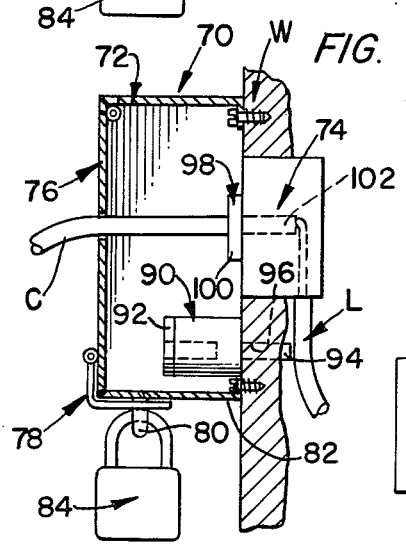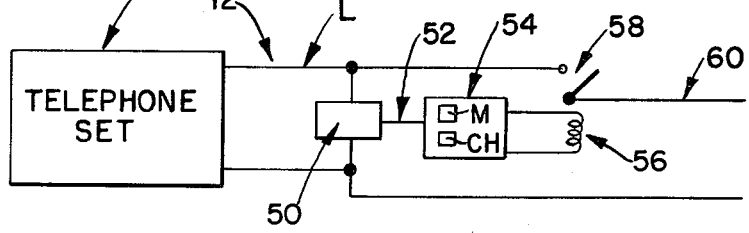

4,297,534

PUSHBUTTON TELEPHONE SET DISABLING MEANS

BACKGROUND OF THE INVENTION

The present invention relates in general to telephones, and, more particularly, to telephone security devices.

Unauthorized use of telephones includes the placing of long distance calls or other calls by one not authorized to place such calls. Furthermore, even if some limited use is authorized, it is possible for such authorized use to be exceeded.

Unauthorized use of the telephone results in losses to business, government, individuals and to the telephone company in all sections and regions of the country, and indeed, the world. Losses caused by unauthorized use of telephones are extremely large, and in some cases, such losses are measured in the millions of dollars per year.

While there are many devices for preventing unauthorized use of rotary dial-type telephones, such as, for example, that device shown in U.S. Pat. No. 2,469,806, there are no devices presently available for effectively preventing unauthorized use of the pushbutton-type telephone. The devices presently available either prevent any use to be made of a telephone by locking the receiver onto the telephone, or the like, or locking the rotary dial, or shorting out the telephone dial completely, or opening the circuit. Most of the presently available electronic rotary dial telephone locks involve some form of digit counter. Examples of digit counters used with rotary dial telephones are disclosed in U.S. Pat. Nos. 4,099,033, 3,786,196, 3,702,903, 3,727,007 and 4,063,036. For example, if long distance calls are to be prevented, a digit counter is associated with a rotary telephone set, and when the total number of digits exceeds a predetermined value, the telephone set is shorted out or open circuited, or otherwise prevented from completing the call.

Most of the presently available devices are quite complicated, expensive and difficult to install. An example of a complicated system which is installed at the switching equipment located at a central office is disclosed in U.S. Pat. No. 4,002,848. Furthermore, in many prior art devices, a user has little, if any, immediate control over the operation of such devices. To change the mode of operation, such user must contact the telephone company, and have a complex operation carried out. Such cost and difficulty are serious drawbacks to these devices.

The mechanical devices which actually lock up a telephone set are cumbersome and easily defeated. The mechanical devices can be easily defeated by using portable TOUCH-TONE (R) pads, or even portable telephone sets, see, for example, the device disclosed in U.S. Pat. No. 4,096,357. The use of portable sets is especially important if the locked telephone set is a modular type set. Accordingly, the mechanical telephone locks are not widely accepted.

The term TOUCH-TONE is a registered trademark, and will be capitalized to denote such; however, the notation (R) will be deleted for the sake of brevity. It is noted here that the terms "dial" or "dialing" as used herein in conjunction with a telephone set being operated as a pushbutton-type set means operation of pushbuttons and is not to be confused with rotary dial-type telephone sets.

There are other devices available for preventing coin fraud, wherein only real coins can be used to operate a pay telephone, and other coins, such as slugs, or the like, will not be effective to allow use of such pay telephones. Examples of such fraud preventing devices are disclosed in U.S. Pat. Nos. 4,031,325 and 4,046,962.

Therefore, there is need for a device which prevents unauthorized use of a telephone set which is being operated as a pushbutton-type set, which device is simple to install and can be easily used and altered by a user.

SUMMARY OF THE INVENTION

The device embodying the teachings of the present invention prevents unauthorized use of a telephone which is being operated as a pushbutton-type set while permitting other uses of that telephone. The device is easily installed and is extremely versatile.

While several forms of the device are disclosed, the preferred form of the device includes a frequency signal altering means which has at least one notch filter therein. As used herein, the term "notch filter" is taken to mean a bandrejection filter that produces a sharp notch in the frequency response curve of a system. The frequency signal altering means is connected into the telephone line of a particular telephone set. The notch filter is tuned to alter the dialing frequency signals generated by or at the telephone set so that a telephone company or other receiving means is prevented from receiving a clear set of TOUCH-TONE frequencies signalled by or at that telephone set. The device includes mechanical means connecting the notch filter to the telephone set. The mechanical means is located so that a user can set the notch filter when restricted use of the telephone is desired.

The form of the frequency signal altering means includes a plurality of notch filters, and one form of the mechanical connecting means includes a selector means. The user can thus select any of a plurality of modes of operation for the telephone disabling means. Thus, a user can prevent all calls, prevent long distance calls, prevent certain calls after a specified time of day, permit calls to emergency numbers, or the like. Control systems are included in some forms of the device for permitting use of credit cards whereby certain cards permit certain uses and other cards permit unrestricted uses, or the like.

The disabling means can be attached directly to the telephone set, can be attached to a wall connection associated with the telephone set, can be attached to a cord leading from the telephone set, or to any other convenient location. The disabling means can also be attached to a plurality of telephone sets by selecting a cord common to such plurality of sets, if so desired.

Another form of the device includes a control system wherein chips or microprocessors control operation of the disabling means. These control elements are programmed in a known manner to permit selection of a particular mode of operation for the disabling means. Thus, certain calls can be permitted while other calls are prevented, times of operation can be selected, and the like, by programming the control elements.

Calls coming in to the protected telephone set are not affected, nor are authorized calls, nor is the overall quality of voice signal coming through the protected telephone set. Only unauthorized calls placed through the disabled telephone set are blocked. The device is easily installed and easily used. A multiplicity of operating modes are possible, thereby allowing the user great versatility. The disabling device of the present invention cannot be defeated by dialing devices such as disclosed in U.S. Pat. No. 4,096,357, nor by blue boxes, portable pads, nor by portable telephones, nor by jiggling the buttons on a telephone set, nor by any other such means or method. Accordingly, not only is the device inexpensive and versatile, it is very secure.

The notch filter or filters remove enough of the frequencies to take the generated frequencies out of the limits of the TOUCH-TONE receiver equipment activation ranges used by a receiving means. The filters of the present invention do not noticeably interfere with normal voice signals.

The notch filter or filters eliminate the proper combination of tones being received by a receiving means. All of the pushbuttons on a pushbutton-type telephone generate a combination of two frequency signals, both of which must be received at certain levels and sequence to activate receiving means equipment. The frequency signals generated by such telephone sets are generally at levels higher than voice levels. By altering or distorting one or both of these frequency signals, the telephone set is effectively disabled without noticeably interfering with voice contact. The filters can include elements selected so that the filter is properly tuned to distort selected frequency signals sufficiently to prevent activation of call processing equipment at the call receiving means. The call receiving means can include a telephone company, a PBX, a key system, a Centrex, or the like. The disabling means is located to prevent proper signals from reaching into the wires to a central office, or such call receiving means.

The disabling means is thus located to be electrically interposed between an individual telephone set circuitry and a call receiving means. That is, the disabling means is located between the relevant part of the telephone set (i.e., magnetic coupling of the handset) and the central office. By "circuitry" it is here meant the handset or other signal pickup means and the internal TOUCH-TONE pad. The call receiving means can include a call processing means which processes telephone calls from individual telephone sets to a telephone company or other such receiving means.

OBJECTS OF THE INVENTION

It is the main object of the present invention to disable a telephone set which can be operated as a pushbutton-type set in a secure manner.

It is another object of the present invention to disable a telephone set which can be operated as a pushbutton-type set with a device which is easily installed.

It is yet another object of the present invention to disable a telephone set which can be operated as a pushbutton-type set with a device which is easily modified to provide a variety of operating modes.

It is still another object of the present invention to disable a telephone set which can be operated as a pushbutton-type set with a device which is located between such telephone set and a telephone company or other such receiving means.

It is a further object of the present invention to remove one or more of the frequencies generated at or by a pushbutton-type telephone set without noticeably interfering with normal voice signals or interfering with signals coming into such telephone set.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective view of a pushbutton-type telephone set including one embodiment of the device embodying the teachings of the present invention.

FIG. 2 is a schematic view of a pushbutton array on a pushbutton-type telephone set.

FIG. 3 is a block diagram showing the location of connection of the telephone disabling means embodying the teachings of the present invention as being electrically interposed between an individual telephone set and a call receiving means.

FIG. 4 is a circuit diagram of a disabling means embodying the teachings of the present invention.

FIG. 5 is a circuit diagram of another disabling means embodying the teachings of the present invention.

FIG. 6 is a circuit diagram of yet another disabling means embodying the teachings of the present invention.

FIG. 7 is a frequency response curve of a disabling means embodying the teachings of the present invention tuned to the frequency shown.

FIG. 8a is a circuit diagram showing a disabling means used to produce the frequency response curve shown in FIG. 8b.

FIG. 8b is a frequency response curve produced by a disabling means embodying the teachings of the present invention.

FIG. 9 is a plurality of notch filters used in the disabling means embodying the teachings of the present invention.

FIGS. 10a and 10b are elevation views of a mechanical means for connecting the disabling means embodying the teachings of the present invention to a telephone set.

FIGS. 11a and 11b are perspective views of another mechanical means for connecting the disabling means embodying the teachings of the present invention to a telephone set.

FIG. 11c is a schematic of another switch used in conjunction with the disabling means embodying the teachings of the present invention.

FIG. 12 is a perspective view of yet another mechanical means for connecting the disabling means embodying the teachings of the present invention to a telephone set.

FIG. 13 is a schematic diagram of another disabling means embodying the teachings of the present invention.

FIG. 21 is a schematic showing switches associated with individual digits.

DETAILED DESCRIPTION OF THE INVENTION

Figure 14:
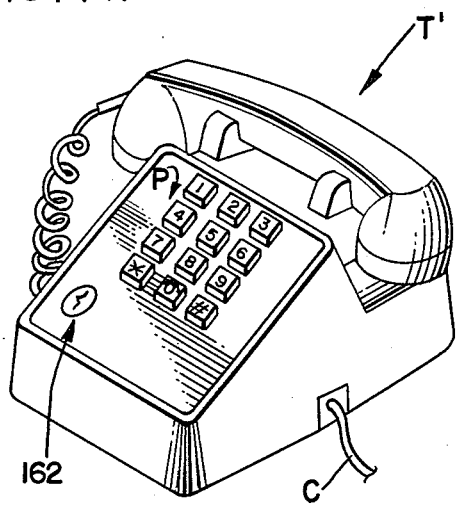
FIG. 14 is a perspective of a pushbutton-type telephone set including an internal disabling means embodying the teachings of the present invention.

Shown in FIG. 1 is a pushbutton-type telephone set T having an array of TOUCH-TONE pushbuttons P. A series of selector buttons S can be used in some cases, if so desired. However, as will be apparent to those skilled in the art from the ensuing description, each separate line will have a separate blocking means. The preferred form of the invention will be disclosed with respect to a single line set. The telephone T includes a telephone cord C connected at one end to the set T and at the other end to a connector means 10 which is shown in FIG. 1 as being mounted on a wall W. As will be apparent from the ensuing disclosure, the connector means 10 can be mounted in a casing spaced from the wall, or within the telephone set, or in the cord C, or the like, and still fall within the scope of this disclosure. The telephone set T can be modular or unitary, and the cord C, of course, can be any type of cord commonly used in conjunction with telephone sets.

The pushbutton array is best shown in FIG. 2, and the frequencies generated by each pushbutton are also shown in FIG. 2. For example, if the number seven pushbutton is operative, the 1209 Hz and the 852 Hz frequencies are generated. Central office equipment recognizes these tones as representing the numeral seven. This equipment, called TOUCH-TONE receivers, translates the oscillator signals to digital signals for machine switching, recognition and operation. The pushbuttons marked * and # are used for certain special signalling, such as credit card varification, or the like. The pushbutton array shown herein is representative, and it is to be understood that other arrays can also be used without departing from the scope of the present disclosure. For example, a ten button array, lacking the * and # buttons can be used, or a sixteen button array can also be used, or the like, or other frequency sets.

As was previously discussed, the frequencies generated at the telephone set T are transmitted via cord C to a central office system, and PBX, key system, or the like. As was also discussed above, due to devices such as disclosed in U.S. Pat. No. 4,096,357, the pushbutton array associated with the set T need not be used to make a call from that telephone set. Accordingly, to prevent unauthorized use of the telephone set T, it is necessary to block the signals coming from or through the set T without regard to whether those signals were generated by the pushbuttons on that set or by some other means. It is also desirable to permit the telephone set to receive incoming signals, such as ringing, voice, or the like while in the outgoing call-blocking mode.

Shown in FIG. 3 is a block diagram of an outgoing call blocking system which will fulfill the above-discussed criteria. Thus, as shown in FIG. 3, a telephone disabling means includes protective circuitry 12 which is inserted in serial in the signal path from the telephone set T to a central office, a PBX, or the like, to be electrically interposed therebetween and to intercept any signals moving between such telephone set and the central office, or the like. The disabling means of the present invention, and hence the protective circuitry, also herein referred to as blocking means, or as frequency signal altering means, can be located in the connecting means 10 as shown in FIG. 1, within the telephone set as shown in FIGS. 14–18, at some intermediate position in cord C, or behind wall W, or the like. As will be apparent from the ensuing discussion, the frequency signal altering means alters the frequencies generated by the "dialing" pushbuttons as indicated in FIG. 2, and the protective circuitry thereof can be placed at the location most suitable therefor. The only requirement is that such circuitry be located with respect to a telephone set T and a call processing means so that "dialing" frequency signals generated by or at the set T will be intercepted prior to those signals reaching a telephone company or other receiving means, such as PBX, keyset, Centrex, or the like.

The frequency signal altering means 12 alters or distorts or blocks frequencies generated by or through the telephone set T but passes voice transmission, signals incoming to the set, or selected frequencies or combinations of frequencies as will be discussed below. The frequency signal altering means 12 of this disclosure includes different circuits, or combinations of circuits, depending on the result to be achieved. These circuits are each tuned to attenuate at a particular resonant frequency to perform the blocking, altering or distorting function as will be apparent from the ensuing discussion. FIGS. 4–9 show several of these circuits, but variations thereof can be used as will occur to those skilled in the art based on this disclosure.

The basic circuit is shown enclosed in the phantom lines in FIG. 4, and is indicated by the reference numeral 20. This basic circuit 20 is referred to as a notch filter and includes a capacitor 22 connected in series with an inductor 24. The circuit is placed across the lines comprising the outgoing telephone L associated with a telephone set T. The elements of the filter 20 are selected so that the filter will be tuned to block the selected frequency or frequencies as will be discussed below. The filter will attenuate so "vertical" frequencies are reduced and level as compared to horizontal sufficiently so that such "vertical" frequencies are not accepted by a PBX, keyset tone, or central office, or the like.

For example, the filter 20, or multiple sections as in FIG. 9, can be tuned to attenuate the "vertical" between the frequencies of 1209 Hz and 1477 Hz, or at the specific TOUCH-TONE frequencies, in which case the frequency response will be that shown in FIG. 7 wherein the base line represents attenuation at 1,000 cps referenced to zero. The phantom line represents three filters and the solid line represents one broad filter.

A plurality of notch filters 20 are used to block several TOUCH-TONE frequencies if so desired. An example of such multiple filters is shown in FIGS. 8 and 9, with FIG. 8a showing two notch filters 20 and 20'. For example, the filter 20 can be tuned to 1209 Hz and the circuit 20' can be tuned to 1477 Hz, in which case the frequency response of the two filter blocking means is shown in FIG. 8b. Such a blocking means will pass the frequencies generated by the operator, "O" pushbutton. It is noted that the frequency signal altering means 12 can thus be adjusted to pass any frequency or combination of frequencies by properly selecting the elements included in the notch filters comprising the blocking means.

A switch 26 is included in each notch filter to selectively insert and remove the associated notch filter into and from the telephone line circuit. The switches will be discussed in greater detail below. Thus, a switch activated notch filter is shown in FIG. 4.

Multiple filter blocking means 12' is shown in FIG. 9, and includes notch filters 20A, 20B and 20C, controlled by switches 26A, 26B and 26C, respectively. An example of such filters includes filter 20A tuned to 1477 Hz. Such a blocking means allows all calls from an associated telephone set where switches 26A, 26B and 26C are open. A frequency signal altering means 12' alters the frequencies associated with all calls originating from the associated telephone set when the switches 26A, 26B and 26C are all closed. The frequency signal altering means 12' allows calls to the operator when switches 26A and 26C are closed, but does not permit "9" calls to outside premises in a typical Centrex or PBX; thus, long distance is eliminated. Of course, all calls and signals coming into the telephone set associated with the frequency signal altering means 12' are essentially unaffected by the frequency signal altering means no matter what mode that altering means is in. Other variations and combinations of filters will occur to those skilled in the art based on this disclosure; accordingly, all possible combinations will not be presented herein for the sake of brevity. However, it is to be noted that such omission is not intended to be limiting.

Referring to FIG. 6, one form of the frequency signal altering means includes a resistor 30 so that attenuation is only to the level required to inhibit TOUCH-TONE receivers. Furthermore, a tuning circuit 34 is included with some forms of the frequency signal altering means. The tuning circuit 34 can be open at the resonant frequency at which the associated notch filter shorts and which is tuned with the associated notch filter as required for selected TOUCH-TONE frequencies. It is noted that the circuit 34 can also be designed to be open at a frequency different from the resonant frequency at which the associated notch filter shorts, if so desired. A plurality of tuning circuits 34 can be used if so desired. As shown in FIG. 6, a switch 27 is associated with the circuit 34 so that switches 26 and 27 are ganged switches. As shown in the "off" position, the parallel filter is open and the series filter switch is closed.

As shown in FIG. 5, another form of the frequency signal altering means includes a varistor 40 in series with a notch filter associated therewith. The varistor prevents activation of the associated notch filter at voltages lower then the selected resonant frequency voltage. Thus, for example, voice signals will not be blocked by a notch filter associated with varistor 40.

It is here noted that the notch filters can be crystal, ceramic, or mechanical filters or other implementations if so desired. A ceramic filter is produced by Radio Materials Corp. of Chicago, Ill. The disabling means herein disclosed is thus located to be electrically interposed between an individual telephone set and a call receiving means such as a PBX, Centrex, or the like. The signals generated at the individual set are intercepted and distorted or altered such that the call receiving means is prevented from receiving a frequency signal, or signals, in a form which is usable to activate call processing equipment. Thus, while tones may be generated at or by an individual telephone set, these tones are prevented from activating receiving equipment in a proper or normal manner.

As above discussed, both frequencies of each number of a TOUCH-TONE system must be received by a telephone company equipment in proper amplitudes and in proper form to activate that equipment. The notch filter, or filters, of the present invention distort the pushbutton frequencies, or at least one of the frequencies, sufficiently to prevent activation of this equipment. The required elements and the values thereof will occur to those skilled in the art based on the knowledge possessed by such skilled worker about telephone signals and the teachings of the present disclosure. Accordingly, specific examples, and the like, will not be presented, but no limitation is intended by such omissions. It is also noted that the filters can be selected to block, distort or alternate the frequency signals as suitable.

Some large office or hotel complexes have processing equipment which processes calls from individual telephone sets to a telephone company or other such receiving means. The disabling means herein disclosed is located to be electrically interposed between individual sets and this call processing equipment as well.

The filters can be tuned to block all calls, or certain calls. The filters can be tuned to permit only calls to the operator, or the like. Thus, for example, if an external call requires that the telephone number be preceded by "dialing" nine, then a filter blocking the frequencies generated by the pushbutton nine can be blocked while other numbers are passed in an unaltered form. Thus, certain telephone sets of a number of telephone sets can be disabled from placing calls external to the system, while other telephone sets of the same system can be used for placing such external calls. Other possibilities will occur to those skilled in the art, and will not be presented herein for the sake of brevity, but such omission is not intended to be limiting.

An alternative embodiment of the blocking means is shown schematically in FIG. 13 and is indicated by the reference indicator 12". The blocking means 12" is associated with the telephone set T and, like the other forms of the blocking means, intercepts signals generated via the telephone set T prior to such signals being received by a telephone company or other receiving means.

The blocking means 12" is connected to a TOUCH-TONE receiver 50 via a line 52. The blocking means includes a control system 54, a relay 56 and a switch 58. The control system 54 can include microprocessors M, chips CH, or the like. These elements are programmed to actuate the relay 56 upon receiving certain, preselected signals from the receiver 50. Receiver 50 may decode exact digits or respond to the total energy in the TOUCH-TONE band to merely count the total number of digits. Hence, a four digit extension and/or a seven digit local number may be allowed, but not a ten digit long distance number. These control system elements can be programmed according to well known techniques, such as are disclosed in *An Introduction to Microcomputers*, by Raymond A. Nelli, published by Adam Osborne and Associates, *Foundations of Microprogramming*, by A. K. Agrawala and T. G. Rauscher, published by Academic Press Inc., *Microprogramming Principles and Practice*, by S. S. Husson, published by Prentice-Hall, Inc. of Englewood Cliffs, N.J., or *Designing with Microprocessors*, by D. L. Cannon, et al., published by Texas Instruments, Inc. of Dallas, Texas, and the materials disclosed in the bibliographies associated therewith.

It is here noted that the term "chip" is meant to include both the common definitions of that term. That is, the term "chip" can include a shaped and processed semiconductor die which is mounted on a substrate to form a transistor, diode or other semiconductor device; or to include an integrated microcircuit which performs a significant number of functions and which constitutes a subsystem. The second definition is preferred for the mode selection function described above with reference to the control system 54. The term "microprocessor" is taken in a general sense as presented in standard texts such as the afore-mentioned Nelli and Cannon, et al. texts, and the like.

Those skilled in the art will be able to properly program such control elements based on the teachings of the present disclosure and the teaching such as described in the just-referenced material. Accordingly, no detailed description will be presented for such control elements and the programming thereof.

Upon actuation of the relay 56, the switch 58 is opened to disconnect the telephone set T from the outline 60 of the line L, and thereby prevent call completion or any subsequent signal generated via the telephone set T from reaching call processing or receiving equipment. The control system 54 can be programmed to release the switch back to the closed position and reset the logic when the receiver of the telephone set T is replaced.

The TOUCH-TONE receiver 50 decodes the signals generated via the telephone set T and transmits the coded digits to the control elements in the control system 54. The logic in the control system 54 decodes the "dialed" signal or total energy in the TOUCH-TONE frequency band, and take appropriate action, be it preventing or permitting that signal to pass to the line 60, and subsequent call completion.

The blocking means 12" can be programmed so a user can bypass the blocking feature thereof. Thus, the control elements in the control system 54 can be programmed to permit "dialing" of an otherwise forbidden number if that number is preceded by a pass code. For example, a special pass code can include a plurality of digits which are signalled in a prescribed time sequence. If such a pass code is used, the control elements and control system 54 permit otherwise forbidden numbers to be "dialed" from the telephone set T. If an incorrect pass code is signalled, the blocking means is either unaffected, that is, the bypass mode is not activated, or is fully activated to block all call completions from the telephone set T until either a new pass code is generated, or some other appropriate action is taken, such as hanging up the receiver, generating a clearing code, calling the operator, or the like.

The control system 54 can be programmed so that certain pass codes permit "dialing" of the operator, certain codes permit calls to emergency numbers, certain codes permit long distance calls, certain codes permit toll calls, certain codes permit unrestricted use of the telephone set, or any combination thereof. Timing means can also be included in the control system 54 so that certain codes permit calls of only specified duration to be made as a further factor to be included in the set of above-discussed factors. After a preselected time, the control system 54 is activated, so that the switch 58 is opened.

It is noted that the previous digits go through before disconnect occurs. In practice, relay 56 will be actuated with about a five second delay, which provides sufficient time for the telephone company to drop the call.

Further combinations can be effected by using plural pass codes. Thus, a first pass code can activate a second pass code so that certain users can select the mode desired, while other users are permitted use of the telephone set in only certain modes. Plural chips and/or plural microprocessors or combinations thereof can be used to accomplish the above-descrived pass code operations.

The control elements can also be programmed to operate the switch 58 upon application of any TOUCH-TONE frequency thereto. Such a program can be time controlled. Thus, for example, after normal working hours, for example 5:00 p.m., the control elements in the control system 54 automatically are set so that any use of the telephone set T will cause the switch 58 to be operated. However, incoming calls can be accepted, and the like.

It is noted that the switch 58 can be a switch 26 to activate the above-discussed filter blocking means if so desired. Accordingly, the control system 54 can also be used in conjunction with the filter blocking means 12 or 12' if so desired.

A lock such as shown in FIGS. 10, 11 and 12 can be included in the control system which selects the mode of operation desired. The locks will be discussed in greater detail below. Furthermore, as will be discussed below, a selector switch can include a timer to automatically set a preselected mode, or modes, of the control system 54 at a specified time, or times, during a 24 hour period.

It is here noted that while chips and microprocessors have been disclosed, other elements can be used to accomplish the operations and functions set forth above. Thus, state-of-the-art circuitry can be substituted for the chips and microprocessors disclosed herein without departing from the scope of the present disclosure, and the specification of chips and microprocessors is intended to include such state-of-the-art circuitry as well.

Various devices can be used for switches 26 and in conjunction with the control system 54. Examples of such devices are shown in FIGS. 10, 11 and 12, and attention is now directed thereto. FIGS. 10a and 10b show a housing 70 which is mounted on a wall W, or other such position in a manner similar to that shown for connector means 10 in FIG. 1. The housing 70 includes a case 72 fixed to the wall W to enclose a telephone wall jack 74 therein. The case 72 has a movable door 76 thereon, and this door has a hasp 78 thereon. The casing has a staple or cleat 80 on bottom 82 thereof which is received through the hasp 78. A lock, such as padlock 84, maintains the hasp attached to the anchor as shown in FIGS. 10a and 10b. The door can include hinges or the like and can be opened after the lock is removed from the anchor to expose the wall jack 74.

The telephone cord C is received through the door 76 and is fixedly and non-removably held therein. The telephone set leadout line L is attached to the wall jack 74. A housing 90 contains the blocking circuitry disclosed hereinabove, and includes a top 92 having means for releasably receiving the cord C to releasably connect the telephone set to the blocking circuitry in the housing in a secure manner as indicated in FIG. 10a. The housing 90 also includes prong means 94 which is received in the wall jack 74 to connect the cord C to the leadout line L via the blocking circuitry located in the housing 90. A receptacle 96 is located adjacent the wall jack so that the housing 90 can be conveniently stored when not in use, as shown in FIG. 10b.

A second housing 98 includes a top 100 for releasably, yet securely, holding the cord C therein. The housing 98 also includes prong means 102 which is received in the wall jack 74 to connect the cord C to the leadout line L via the housing 98. The housing 98 is merely a jack itself and provides a direct connection between the telephone set T and the leadout line L. Thus, when the housing 98 is in place, the telephone set T can be used in an unrestricted manner. The housing 98 can be stored in the receptacle 96 when the blocking means is in use, as shown in FIG. 10a. The wall jack is wired to the incoming cable connection in any suitable manner. The switch 26 may also be used in the housing 70 in place of the just-discussed mechanical connections. Indeed, a switch 26 can be used in conjunction, or in place of, any of the herein disclosed switches. Those skilled in the art will understand how such substitutions can be made based on the present disclosure.

Thus, when a user wishes to restrict use of a telephone set, the housing 70 is opened and the blocking circuitry containing housing 90 is inserted into the jack 74 and the cord C is inserted into the housing 90. The housing 70 is then closed and the lock 84 placed thereon. Unrestricted use of the telephone is obtained in a similar manner using the housing 98 in place of the housing 90. The cord C is held on the housing 70 securely enough to prevent removal thereof from that housing.

Another device for use with the switch 26 or in conjunction with the control system 54 is shown in FIGS. 11a and 11b. This device includes a keylock 110 which has a lock housing 112 and a set of discs 114. The lock housing includes a sleeve 116 to which a disc 118 is securely attached. A key barrel 120 is rotatably mounted in the sleeve and includes a lock 122 having tumblers, springs, cams and the like which cooperate with keyways, and the like, on the sleeve in a manner usual to locks to lock the barrel to the sleeve in a manner which prevents rotation of the barrel relative to the sleeve when the lock is in a locked configuration, and which permits rotation of the barrel relative to the sleeve when the lock is in an unlocked configuration. A key slot 124 is defined in face 126 of the barrel for receiving an appropriate key to operate the lock. An authorized user will possess a key to unlock the device 110.

A second disc 130 is attached to the key barrel 120 for rotation therewith. Housings 132 and 134 are mounted on the disc 130 for rotation therewith. One of the housings, housing 132, for example, will contain the blocking means, and the other housing, the housing 134, for example, will contain direct connection means.

A third disc 136 is non-movably and non-rotatably mounted on a suitable supporting means and is non-removably connected to a telephone set leadout line L. The telephone set cord C is connected to the first disc 118 in a fixed manner. Rotation of the key barrel after the lock is released moves the housings 132 and 134 so that one of the housings is interposed between the cord C and the line L. Suitable electrical connection means is included in the housings and the discs 118 and 136 at the locations of the cord and the line L, respectively, to accomplish electrical contact between the blocking circuitry in the housing 132 and the cord C and the line L to interpose that circuitry between the telephone set and the line L as above-discussed, and to establish electrical contact between the housing 134, the cord and the leadout line to establish direct connection between the cord and the leadout line. Sliding contact plates or the like can be used to establish such electrical connections.

The sleeve 116 is securely mounted, and an authorized user need only insert a key into the lock and rotate the released barrel into the appropriate position.

There can be several positions of the barrel 120 with respect to the sleeve 116 so that various modes of blocking can be selected by rotating the barrel to various positions. Thus, a vertical orientation for the key slot 124, as shown in FIG. 11a, can be a direct connection producing an unrestricted use of the telephone set, a 45° position for the slot can produce toll call restriction, a 90° position can produce timed restriction, and the like.

Alternatively, the central disc 130 can be replaced by a multi-lobed cam with the housings 132 and 134 located on individual ones of the lobes of the cam. As the cam is rotated, the cam lobes will move the housing into the desired orientations. As many lobes as is necessary can be used for the central cam so a plurality of operating modes can be provided.

It is noted that the switches disclosed in FIGS. 11a and 11b are only one form which can be used. Standard, off-the-shelf, type switches can also be used and suitably wired to accomplish the desired functions, if so desired.

A schematic diagram of a multi-position, multi-pole switch 140 is shown in FIG. 11c. A special mount can be used. The switch 140 is suitably wired as by wires 141, and includes pole discs 142 mounted on a shaft 144. The shaft 144 is rotatably mounted and is connected to a key or combination operated lock 146 and poles 148 are connected thereto for rotation therewith. Poles 149 are associated with the pole discs, and on suitable rotation of the shaft, suitable modes of operation of the disabling circuitry are selected.

Yet another device for use with the switches 26 and/or with control system 54 includes a controller 150 as shown in FIG. 12. The controller includes a housing 152 to which cord C and leadout line L are fixedly and non-removably attached. The housing contains the blocking circuitry, and includes a mode selector 156. The mode selector includes a dial 158 and mode indicia 160 on the face of the housing 152. The mode selector can be a timer, with selected times of various modes or combinations of modes indicated by the indicia 160, or the indicia 160 can simply indicate various modes or combinations of modes for the blocking means. The selector is fixed and includes a lock 161 to release the mode selector 156. Once a mode is selected by moving the selector 156 to point to an appropriate indicia, the lock is set to prevent movement of the selector until released by again unlocking the lock 161. If the controller 150 is used as a timer, for example, the indicia can be graduated to indicated times such as, for example, 1:00 p.m., 2:00 p.m., . . . , or the like. Multiple selectors can also be used to set combinations of modes at various times, if so desired.

Figure 17:
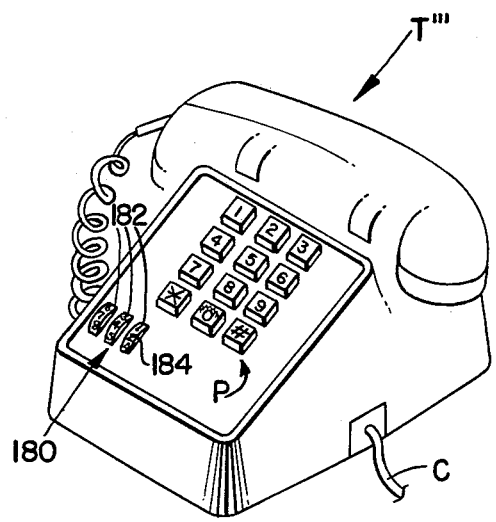
FIG. 17 is a perspective of a pushbutton-type telephone set including a combination lock.
Figure 16:
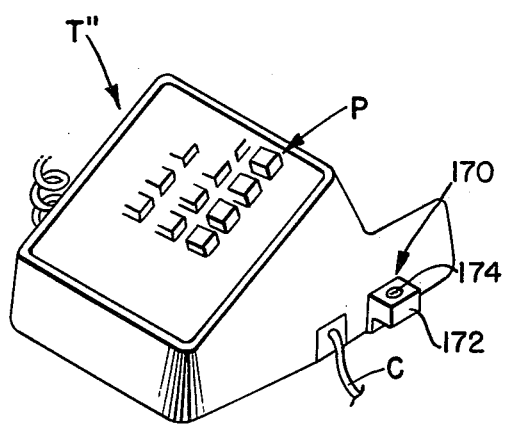
FIG. 16 is a perspective of a pushbutton-type telephone set including a disabling means attached to such telephone set.

The blocking means can be located directly on, or within the telephone set as shown in FIGS. 14, 16 and 17. Such blocking means can be sold with the telephone set itself, or as an add-on kit to be installed by the kit purchaser. The add-on kit will permit a user to convert an unrestricted telephone set into a restricted set. The built-in device permits a purchaser to substitute an authorized user only set for another unrestricted use telephone set.

It is also noted that a blocking means unit can be located between a telephone set T and connecting means 10 shown in FIG. 1. The cord C would be broken, and the blocking means inserted in the cord. Such a blocking means has means for securely holding the cord to prevent removal of that cord from the housing. The blocking means shown in FIGS. 10, 11, 12 are suitable for such use.

A blocking means inserted in a cord is useful at a reception desk or the like where a telephone set is available for public use. A receptionist has a key to operate the selector on the blocking means housing, or a key to release that selector, so that the telephone set can be used. The use of the telephone set is thus controlled.

Figure 19:
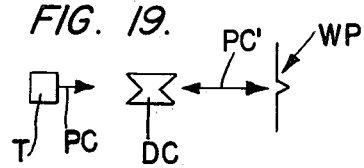
FIG. 19 is a schematic of a modular unit setup which includes a disabling means embodying the teachings of the present invention.

In the case of modular plugs and jacks, the unit can be a plug/jack, or typical jack/jack combinations. A schematic of such a setup is shown in FIG. 19. A telephone T is connected to disabling circuitry DC via a plug PC, and the circuitry DC is connected to a wall plug WP via another plug PC'.

In the internal blocking means embodiments shown in FIGS. 14, 16 and 17, the blocking circuitry is located within the telephone set, and the switch operating means for operating switches 26, and/or for use in control system 54, is located on the set for access thereto externally of the set. Any of the afore-discussed blocking means, including the blocking means 12, 12' and 12", can be used as an internal blocking means. Any of the afore-discussed locks can be used as a lock on these internally located disabling means.

A lock 162 is included in the telephone set T' shown in FIG. 14, and the FIG. 11 lock is quite suitable for use as the lock 162, including the various mode selection feature discussed in connection with the FIG. 11 device. Using the various blocking means hereinabove discussed, the internal blocking means can be set to permit only operator codes to be "dialed", only emergency numbers, or the like. The lock 162 can be located anywhere on the set T', and the position shown in FIG. 14 is only preferred, and is not restrictive.

Figure 15:
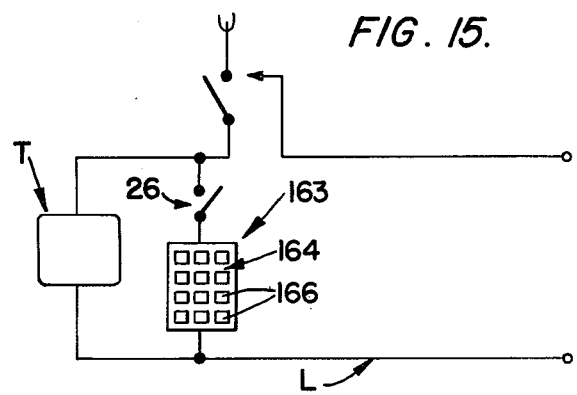
FIG. 15 is a schematic of a pushbutton-type telephone set including a keyboard array of pushbuttons controlling a disabling means embodying the teachings of the present invention.

A lock 163 is shown in FIG. 15, and includes a small keyboard 164 similar to the main set keyboard array shown in FIG. 2. The keyboard can be located in any convenient location, but is preferably located on the telephone itself. The keyboard 164 contains pushbuttons 166 corresponding to the pushbuttons P of the main array. These pushbuttons can be set to disable specified digits using another lock or a code, can be used as a combination lock, or the like. A control system which includes chips and/or microprocessors can be used with the lock 163 to permit use of the blocking means setting codes, and bypass of flowthrough codes, and combinations thereof. Such means will be discussed below.

An externally located blocking means 170 is shown in FIG. 16 in conjunction with a telephone set T". The lock 170 is located within a housing 172 fixed to the telephone set housing. The electrical connections of the blocking means 170 are securely set and cannot be removed from outside the housing 172. A lock 174 is included in the blocking means 170 and can be similar to the lock 162 or the lock 163.

It is also noted that lock 170 can be used to disable an existing TOUCH-TONE phone. The switch 170 can be installed between the TOUCH-TONE pad and the power thereto. An authorized user has a key which locks or unlocks the switch 170, and by suitably orienting the key lock mechanism as above discussed in regard to FIGS. 11a–11c, the pad can be connected to or disconnected from the associated power source.

Figure 20:
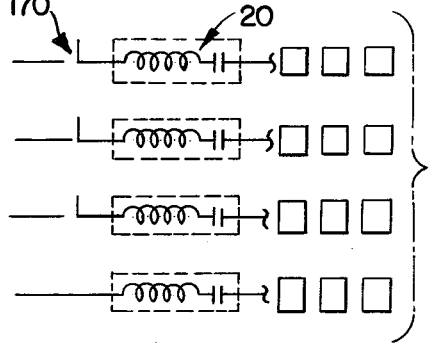
FIG. 20 is a schematic showing a plurality of switches each associated with an individual set of oscillators.

FIG. 20 is a schematic diagram of a setup wherein several switches, such as switch 170, are each individually connected to a given set of oscillators so that such given set of oscillators can be disconnected. It is noted that FIG. 20 shows the fourth row of oscillators, corresponding to "O" being active, while the remaining rows are disconnected. The switches are indicated in FIG. 20 as 170', but any suitable mechanical switch can be used. As shown in FIG. 20, the switches are used in conjunction with a notch filter 20 in the preferred form. However, the switches 170' can be used as above discussed to completely disconnect a given oscillator from a power source, of so desired.

A combination lock 180 is shown in FIG. 17 in conjunction with a telephone set T''', and includes three sets of tumbler actuation wheels 182 having indicia 184 thereon. The lock 180 operates similar to a keylock, in that when the proper combination is set, the frequency signal altering means is set by actuating switch 26, or control system 54.

Figure 18:
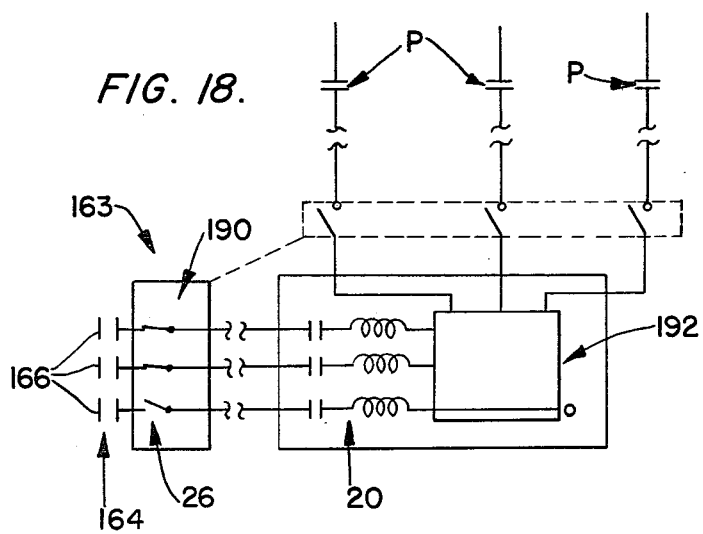
FIG. 18 is a schematic of the connection of the FIG. 15 disabling means to a telephone set.

A blocking means using lock 163 is schematically shown in FIG. 18. The keyboard 164 with pushbuttons 166 thereon is connected to the telephone set as indicated in FIG. 18, and the blocking means associated therewith is connected to the telephone set pushbuttons P as indicated in FIG. 17. Individual ones of the pushbuttons 166 are depressed, and a holding circuit means 190 associates these pushbuttons with corresponding ones of the pushbuttons P and holds that connection. The holding circuit means is disconnected by hanging up the telephone or by "dailing" a special code, or the like. In FIG. 18, for example, the operator pushbutton is not disabled. A main connection means 192 connects the frequency signal altering means to the telephone set pushbutton circuits. A control system similar to the control system 54 can be included in the connection means 192 to permit selection of blocking modes as discussed in connection with the FIG. 13 blocking means 12".

The combination lock 180 can also be connected to the frequency signal altering means in a manner similar to the connection of the keyboard 164 as shown in FIG. 18. Various combinations can be used to select various modes of operation using the lock 180. A timer can be associated with the lock 180 as well, to provide a time control mode also.

It is also noted that using a control system similar to the control system 54, which includes chips and/or microprocessors, a signal to the user, for example, visual or audible, or a recorded message or return of a dial tone can be included in this disabling device. Thus, if a blocked number, or sequence of numbers, is "dialed" from or through the telephone set T, the control system will in some suitable manner notify a user that the call was not completed.

Yet another embodiment of the present invention is shown in FIG. 21. FIG. 21 schematically indicates how the device embodying the teachings of the present invention can be used to disable, disconnect, or otherwise control individual digits of a TOUCH-TONE telephone. As shown in FIG. 21, as an example, a pair of switch leads 200 and 202 can be brought out for each digit DP. A switch, such as switch 26, 170, 170', 180, 110, or any other switch disclosed herein, or the logic circuitry 54, is connected to the leads. The switch is shown in FIG. 21 by a block ST to indicate that any of the above-disclosed switches can be used. The switches ST can include mechanical means such as levers or the like to mechanically touch switches to activate the oscillators, or to appropriately control operation of the associated switches 26, 170, or the like.

The devices disclosed herein can all be used in conjunction with rotary or dialless telephones to prevent use of a portable pad such as discussed above with regard to U.S. Pat. No. 4,096,357 with those rotary or dialless telephones to defeat any mechanical locks used on those telephones. Thus, telephone T can be a rotary or dialless telephone as well as a pushbutton-type telephone.

As this invention may be embodied in serveral forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A device for preventing unauthorized use of a pushbutton telephone set comprising:
   disabling means connected to the telephone set to be electrically interposed between the telephone set and a line connecting that telephone set to a call receiving means such as a central office, PBX, key system centrex, or the like, said disabling means including frequency signal altering means which alters at least one of said intercepted frequency signals in a manner such that the call receiving means is prevented from receiving a set of frequencies in a form which is required to operate equipment at such call receiving means so that such equipment will not be operated by said at least one altered frequency signal and a call which includes said altered frequency signal will not be completed, said disabling means permitting the telephone set to receive signals incoming thereto; and
   connecting means on said disabling means for selectively connecting said frequency signal altering means to the telephone set and disconnecting said frequency signal altering means from the telephone set at any time.

2. The device defined in claim 1 wherein said frequency signal altering means includes a filter which is tuned to alter at least one TOUCH-TONE frequency signal from a TOUCH-TONE telephone.

3. The device defined in claim 2 wherein said filter is a notch filter.

4. The device defined in claim 1 wherein said frequency signal altering means includes a plurality of filters each of which substantially prevents passage of a TOUCH-TONE frequency from a TOUCH-TONE telephone.

5. The device defined in claim 4 wherein said filters each include a notch filter.

6. The device defined in claim 1 wherein said frequency signal altering means includes a plurality of notch filters which are tuned to alter but one of the dialing frequencies generated at the telephone set.

7. The device defined in claim 1 wherein said frequency signal altering means includes a frequency signal altering means which passes voice signals in an essentially undistorted manner but which distorts TOUCH-TONE signal frequencies sufficiently so that the call receiving means cannot receive a usable form of such frequency signals.

8. The device defined in claim 2 wherein said frequency signal altering means includes a crystal filter.

9. The device defined in claim 2 wherein said filter includes a series combination of an inductor and a capacitor.

10. The device defined in claim 1 wherein said connecting means includes a lock box connected to the telephone line leading from such individual telephone set.

11. The device defined in claim 10 wherein said lock box includes a movable means having said frequency signal altering means thereon.

12. The device defined in claim 11 wherein said movable means also has a normal circuit thereon which permits full use of the telephone set, said normal circuit being spaced from said frequency signal altering means.

13. The device defined in claim 12 further including moving means on said lock box for moving said movable means to connect said frequency signal altering means to such individual telephone set.

14. The device defined in claim 13 wherein said moving means includes a lock.

15. The device defined in claim 14 wherein said lock includes a key lock.

16. The device defined in claim 1 wherein said disabling means includes means preventing all calls beginning with "1".

17. The device defined in claim 16 wherein said disabling means permits use of frequencies used to dial operator.

18. The device defined in claim 17 wherein said connecting means includes password means for bypassing said disabling means and permitting full unobstructed use of the telephone set when said disabling means is connected to the telephone set.

19. The device defined in claim 10 wherein said lock box includes connecting means for connecting said lock box to a modulator telephone set.

20. The device defined in claim 1 wherein said disabling means includes a digital chip.

21. The device defined in claim 3 wherein said notch filter includes a resistor connected in series with a capacitor.

22. The device defined in claim 5 wherein each notch filter includes a resistor connected in series with a capacitor.

23. The device defined in claim 1 wherein said disabling means is closely adjacent the telephone.

24. The device defined in claim 1 wherein said disabling means is connected to a plurality of individual telephones.

25. The device defined in claim 1 wherein said connecting means includes manually operable means for connecting and disconnecting said disabling means and the telephone set.

26. The device defined in claim 1 wherein said connecting means includes timing means for connecting and disconnecting said disabling means and the telephone at prescribed times.

27. The device defined in claim 1 wherein said connecting means includes a bypass means for circumventing said disabling means and permitting frequency signals generated by the telephone set to pass through said disabling means, said bypass means being actuated by a predetermined code generated at the telephone set.

28. The device defined in claim 1 wherein said intercepted frequency signals are substantially blocked by said disabling means.

29. The device defined in claim 1 wherein said disabling means further includes a bypass means for circumventing said disabling means and permitting frequency signals generated by the telephone set to pass through said disabling means, said bypass means being actuated by a predetermined code generated at the telephone set and wherein bypass means includes first code means receiving signals from the telephone set and second code means controlled by said first means and connecting the telephone set to the call processing means, said first code means being activated by said predetermined code and activating said second code means to permit signals generated by the TOUCH-TONE telephone to be received by the call processing means.

30. The device defined in claim 29 wherein said code means include chips.

31. The device defined in claim 1 wherein said disabling means includes a chip.

32. The device defined in claim 27 wherein said bypass means permits calls to be made to an operator.

33. The device defined in claim 1 wherein said connecting means further includes a timing means for activating said frequency signal altering means at preselected times.

34. The device defined in claim 1 wherein said connecting means includes a combination lock.

35. The device defined in claim 1 wherein said disabling means includes a pushbutton lock having a plurality of pushbuttons thereon.

36. The device defined in claim 1 wherein said disabling means is positioned within the telephone set.

37. The device defined in claim 36 wherein said disabling means is attached to the telephone set.

38. The device defined in 36 wherein said disabling means includes a lock on the telephone set.

39. The device defined in claim 38 wherein said lock includes a key lock.

40. The device defined in claim 38 wherein said lock includes a combination lock.

41. The device defined in claim 38 wherein said lock includes a keyboard having a plurality of pushbuttons thereon.

42. The device defined in claim 2 wherein said frequency signal altering means includes means for filtering substantially all TOUCH-TONE frequencies from such TOUCH-TONE telephone.

43. The device defined in claim 9 wherein said filter further includes a diode in series with said inductor and said capacitor.

44. The device defined in claim 2 wherein said filter includes a parallel combination of an inductor and a capacitor.

45. The device defined in claim 2 wherein said frequency signal altering means includes a ceramic filter.

46. The device defined in claim 2 wherein said frequency signal altering means includes a mechanical filter.

47. The device defined in claim 1 wherein said disabling means is connected to a given set of oscillators in such telephone.

48. The device defined in claim 1 wherein said disabling means is associated with a rotary dial telephone to alter at least one frequency of multifrequency dial signals generated from that rotary dial telephone.

49. The device defined in claim 1 wherein said disabling means is associated with a dialless telephone to alter at least one frequency of multifrequency dial signals generated from that dialless telephone.

50. The device defined in claim 1 wherein said connecting means includes a lock switch.

* * * * *